United States Patent [19]

Sherman et al.

[11] Patent Number: 6,047,005

[45] Date of Patent: Apr. 4, 2000

[54] VIRTUAL BEARER CHANNEL PLATFORM FOR PROCESSING SERVICE REQUESTS RECEIVED IN THE FORM OF CHANNEL DATA

[75] Inventors: Frederick A. Sherman, Mesquite; Ranga R. Dendi, Plano, both of Tex.; Timothy A. Morgan, Snellville, Ga.; Robert Gary Leonard; Duke Bond, both of Plano, Tex.

[73] Assignee: MCI Communications Corporation, Washington, D.C.

[21] Appl. No.: 09/004,153

[22] Filed: Jan. 7, 1998

[51] Int. Cl.[7] .................................................. H04J 3/12
[52] U.S. Cl. ......................... 370/522; 370/384; 379/219; 379/269
[58] Field of Search ..................... 370/259, 399, 370/401, 402, 480, 522, 384, 426; 379/27, 201, 207, 265, 219, 220, 269, 350

[56] References Cited

U.S. PATENT DOCUMENTS

| | | | |
|---|---|---|---|
| 5,590,181 | 12/1996 | Hogan et al. | 379/114 |
| 5,600,643 | 2/1997 | Robrock, II | 370/399 |
| 5,657,451 | 8/1997 | Khello | 370/259 |
| 5,774,668 | 6/1998 | Choquier et al. | 370/480 |
| 5,881,131 | 3/1999 | Farris et al. | 379/27 |

*Primary Examiner*—Douglas W. Olms
*Assistant Examiner*—Shick Hom

[57] ABSTRACT

A virtual bearer channel platform includes a plurality of transaction processing units. Each transaction processing unit processes one or more service requests received as a call on a bearer channel. The call data is distributed to individual transaction processing units using a high-speed shared network such as a SONET-type network. In one embodiment, the standard SONET format is modified to eliminate fields which contain data of no significance to the present environment. In another embodiment, the standard SONET format, itself, is used. The platform includes a resource manager for allocating the newly received calls to individual transaction processing units. The resource manager sets up outbound calls when requested by a transaction processing unit. A gateway interfaces with the resource manager and the external communication network for assisting in call setup in both inbound and outbound directions.

16 Claims, 11 Drawing Sheets

| A1 | A2 | C1 |
|----|----|----|
| B1 | E1 | F1 |
| D1 | D2 | D3 |

| H1 | H2 | H3 |
|----|----|----|
| B2 | K1 | K2 |
| D4 | D5 | D6 |
| D7 | D8 | D9 |
| D10 | D11 | D12 |
| Z1 | Z2 | Z3 |

440

FIG. 4B

VIRTUAL BEARER CHANNEL PLATFORM FOR PROCESSING SERVICE REQUESTS RECEIVED IN THE FORM OF CHANNEL DATA

BACKGROUND OF THE INVENTION

1. Field of the Invention

The present invention relates generally to the field of telecommunications, and more specifically to a system and method for processing service requests.

2. Related Art

Voice or audio platforms (also known as voice or audio response units) are generally used to provide services using automated call processing. Commonly known examples of such services include processing collect calls, operator assisted calls and sales transactions. In a typical scenario, a caller places a call to the platform to request a specific service.

The platform determines the desired service based, for example, on the number dialed by the caller and information provided by the caller over a bearer channel. The platform directs the call to an application running on a transaction processing unit. The transaction processing unit executes an application to provide the service. An example of a transaction processing unit is a voice response unit.

For example, a caller can dial 1-800-COLLECT to make a collect call processed by the platform. At the platform, a voice response unit (transaction processing unit) is assigned to the incoming call. Determining the call to be a 1-800-COLLECT call, the voice response unit will play scripted messages for the caller and record information received from the caller. Such information can include the caller's name (i.e., as spoken by the caller) and the phone number the caller desires to call (e.g., by entering digits into the telephone keypad).

The voice response unit will then make an outgoing call from the platform to the called party. Once this outgoing call is established, the voice response unit will play scripted messages for the called party to effect call acceptance. The voice response unit will identify the caller for the called party by playing back the pre-recorded voice of the caller identifying himself. The voice response unit will also ask the called party to indicate (using the telephone keypad or otherwise) whether the call is accepted. Finally, if the called party accepts the call, then the call must somehow be connected between the caller and the called party.

Typically, the voice response units receive and transmit calls over dedicated connections. The voice response units are generally connected to a select number of large bandwidth pipes, such as T1s, in a known manner. As is well known, a T1 pipe contains twenty-four channels (DS0s). The dialogue between the caller and the voice response unit, or alternatively between the platform and the called party, takes place over one or more of these channels. The channels can carry voice or data information in a digital format.

Unfortunately, in conventional platforms, the T1s are dedicated to the voice response units, and cannot share bandwidth. That is, each voice response unit is assigned a fixed number of T1s for calls coming into the platform from the network, and also a fixed number of T1s for calls going out over the network from the platform. Typically, the platform is designed so that each voice response unit has an equal number of T1s for inbound calls and for outbound calls. In the above example, the inbound call from the 1-800-COLLECT caller is over a dedicated inbound T1, whereas the outbound call to the called party is over a dedicated outbound T1.

However, this practice is extremely wasteful of circuit resources. Most service requests to the platform do not require outbound T1s. The outbound T1s are dedicated and cannot be used for incoming calls. However, the platform service provider may have no other option than a dedicated connection, in order to provide adequate customer service.

Such dedicated allocation of bandwidth may also lead to inefficiency in the usage of other platform resources. For example, the platform may have the processing power, but not the required bandwidth, to process a transaction. As a result, all the components of the platform, specifically the voice response units, will not be optimally utilized.

Another problem relates to the provision of signaling. In modem systems, the signaling network is separated from the switched voice network. Signaling is used to handle call setup, takedown and information processing. This includes monitoring the status of the trunks, indicating the arrival of an incoming call, transmitting routing and destination signals, etc. Signaling is handled separately from the actual voice circuits to minimize the load on the voice circuits and establish a more efficient network architecture.

SUMMARY OF THE INVENTION

The present invention is directed to a specialized virtual bearer channel platform. A virtual bearer channel platform can control the transport of voice and digital data information over a bearer channel.

The platform processes a service request received from a telecom network. The platform includes a plurality of transaction processing units. It also includes a distribution network. The distribution network is coupled to the plurality of transaction processing units.

The platform also includes a cross-connecting controller. The cross-connecting controller is coupled to the distribution network and the telecom network. It receives data corresponding to the service request from the telecom network. It also provides the received data on the distribution network to one of the transaction processing units. The bandwidth on the distribution network is shared by the transaction processing units. More specifically, the platform is connected to the telecom network with one or more bearer channels identified by bearer channel circuit identification codes (CICs). The bearer channel CICs specify a physical circuit where a bearer channel data is to be transported.

The transaction processing units can process or transmit a service request. The distribution network provides communications with the transaction processing units via distribution network elements. These elements are byte positions of a signal transmitted over the distribution network. Therefore, the cross-connecting controller couples the one or more bearer channels to the distribution network.

In a preferred embodiment, the platform has a resource manager. The resource manager controls how the transaction processing units access the distribution network circuits. It includes a status device for maintaining a status of both the bearer channels and the distribution network elements.

For an inbound service request, the resource manager retrieves the identity of the bearer channel (i.e., the CIC) from a signaling message received from the telecom network. It translates the bearer channel into distribution network elements using the status device. It then determines which of the transaction processing units will process the inbound service request over the distribution network elements.

For an outbound service request, the resource manager responds to a request from one of the transaction processing units. In response, the resource manager assigns a bearer channel for transmission of the outbound service request. The resource manager transmits the identity of the available bearer channel via a signaling message over the telecom network to a called party. Once acknowledgment is received that the called party is connected (from the telecom network), the resource manager translates the bearer channel to a distribution network circuit and instructs the transaction processing unit to process the outbound service request using this distribution network.

In a preferred embodiment, the platform has a gateway. The gateway is a programmable protocol converter used to provide all signaling functions for the platform. The gateway receives signaling messages from the telecom network, and also transmits signaling messages to the telecom network. The gateway is the interface between the virtual bearer channel platform and the telecom network.

For a signaling message received from the telecom network, the gateway converts it to an internal message, in an internal protocol used by the platform. For example, the received signaling message can be a common channel signaling (CCS) message, which is converted by the gateway to a TCP/IP message. Similarly, for a message in the internal protocol received from the platform (specifically the resource manager), the gateway converts it to a signaling message for transmission over a CCS network. Here, a platform TCP/IP message is converted to a CCS message.

FEATURES AND ADVANTAGES

The present invention provides a number of important features and advantages. The transaction processing units share bandwidth on the distribution network, which acts as a shared bus between the transaction processing units. Because the connection is not dedicated, there is no need to waste bearer channels on the trunks used for processing the service request.

Accordingly, the invention allows the bandwidth available between the bearer channel network and the transaction processing units to be optimally utilized. For the same reasons, the transaction processing units are not necessarily constrained by the number of channels available to receive or send data. The transaction processing units can be made to optimally process service requests.

The separation of the signaling network and the bearer channels is of great importance in optimizing the processing power of the platform. Because the platform is an intelligent device, the platform resources, especially the bearer channels, are used more extensively than in an ordinary voice response platform. The present invention independently handles the assignment and maintenance of the bearer channels using the resource manager and the gateway to provision time slots in the unique distribution network.

BRIEF DESCRIPTION OF THE FIGURES

The present invention will be described with reference to the accompanying figures, wherein:

FIGS. 4A, 4B and 4C are diagrams illustrating a standard SONET format and a modified SONET format employed in accordance with embodiments of the present invention;

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Figure 1:
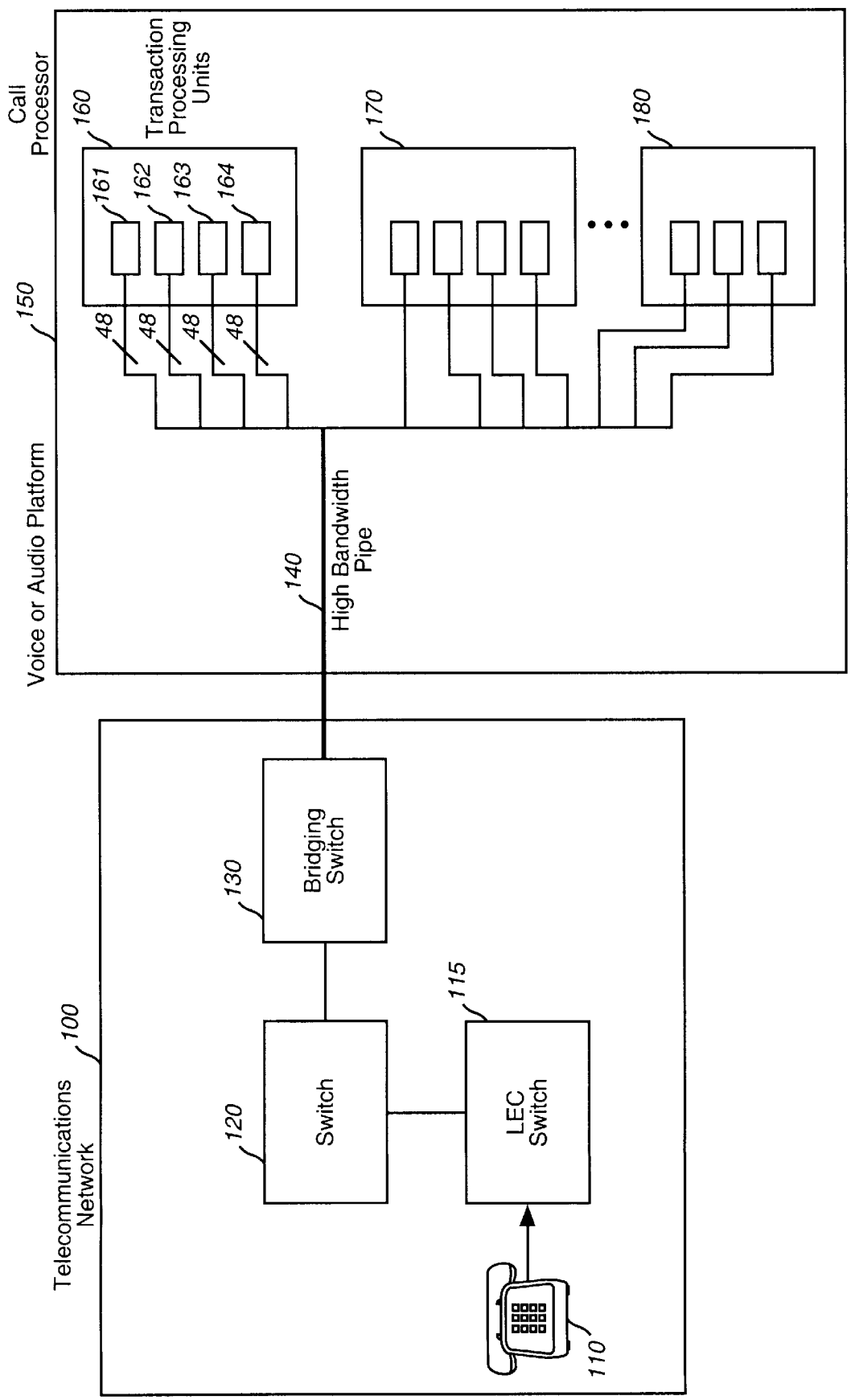
FIG. 1 is a block diagram illustrating a typical connection between a telecommunications network and a voice or audio platform.

| Table of Contents | |
|---|---|
| I. An Example Environment | 11 |
| II. A Dedicated Channel Connection | 12 |
|    A. Telecommunication network | 12 |
|    B. Telephone terminal | 13 |
|    C. LEC switch | 13 |
|    D. Switch | 13 |
|    E. Bridging switch | 14 |
|    F. Voice or audio platform | 14 |
|       1. Call processors | 15 |
|       2. Transaction processing units | 15 |
|    G. High bandwidth pipe | 16 |
|    H. Signaling network | 16 |
| III. The present invention | 17 |
|    A. Disadvantages of the dedicated channel connection | 17 |
|    B. An introduction | 18 |
|    C. Transmission of the call to the bridging switch | 19 |
|    D. SONET Bus | 21 |
|    E. The virtual bearer channel platform | 26 |
|       1. Distribution network and SONET interfaces | 27 |
|       2. SONET cross-connecting controller | 28 |
|       3. Gateway | 28 |
|       4. Resource Manager | 29 |
|          a. Maintaining resource status | 30 |
|          b. Incoming Calls | 31 |
|          c. Outgoing calls | 32 |
|          d. Unavailability or failure of resources | 32 |
|    F. Establishing an incoming bearer channel with a transaction processing unit | 33 |
|    G. Establishing an outgoing bearer channel with the called party | 36 |
|    H. Releasing the virtual bearer channel platform | 39 |
|    I. Unavailability or failure of resources | 40 |
|       1. Transaction processing units unavailable | 41 |
|       2. Transaction processing unit failure | 41 |
|    J. A supplemental embodiment | 41 |
| IV. Conclusion | 43 |

I. An Example Environment

The present invention is described in terms of an example environment. In the example environment, an originating caller attempts to make a collect call, for example, by dialing 1-800-COLLECT. The call is routed over a telecommunications network to a voice or audio platform, specifically a virtual bearer channel platform which can process digitized voice data. The platform has transaction processing units, which are for example voice response units.

At the platform, a transaction processing unit is assigned to the incoming call. The transaction processing unit, determining the call to be a 1-800-COLLECT call, will play scripted messages for the caller and record information received from the caller. Such information can include the caller's name (i.e., as spoken by the caller himself) and the phone number the caller desires to call (e.g., by entering digits into the telephone keypad).

The transaction processing unit will then make an outgoing call from the platform to the called party. Once this outgoing call is established, the transaction processing unit will play scripted messages for the called party to effect call acceptance. For example, the transaction processing unit can identify the caller by playing back the pre-recorded voice of the caller identifying himself. In addition, the transaction processing unit can ask the called party to enter a digit on the telephone keypad to indicate whether or not he accepts the call.

If the called party accepts the call, a bridging switch, which processes the incoming and outgoing legs of the call to the platform, will bridge the call between the caller and the called party. In bridging the callers together, the bridging switch releases the call connections with the platform. In other words, the bridging switch releases the incoming and outgoing legs of the call directed to and from the platform.

The description in such terms is provided for convenience only. It is not intended that the invention be limited to this example embodiment. For example, the present invention can be used to support other types of calls coming into the platform (other than 1-800-COLLECT type calls) that require processing by the transaction processing units. In fact, after reading the following description, it will become apparent to persons skilled in the relevant art(s) how to implement the present invention in alternative embodiments.

The present invention can best be understood by describing first the features of a dedicated channel connection, followed by the features of the present invention which overcomes significant disadvantages of the dedicated channel.

II. A Dedicated Channel Connection

FIG. 1 is a block diagram illustrating a typical connection between a telecommunications network and a voice or audio platform. FIG. 1 includes telecommunications network 100 and voice or audio platform 150.

A. Telecommunication network

Telecommunications network 100 comprises a telephone terminal 110, a LEC switch 115, a switch 120, and a bridging switch 130. A voice or audio platform 150 comprises call processors 160, 170, 180 and transaction processing units 161–164 (as well as transaction processing units that are shown but not labeled). Each transaction processing unit receives 48 channels over two TI trunks.

The bridging switch 130 is connected to the voice or audio platform 150 via a high bandwidth pipe 140. The high bandwidth pipe 140 comprises numerous individual trunks.

Telecommunication network 100 can include a conventional network employing signaling, specifically a CCS network. Telecommunication network 100 can be a private network (e.g., telecommunication links etc. owned and/or operated by private entities such as corporations). On the other hand, the telecommunications network can also be a public network or a combination of private and public networks. The operation of telecommunication network 100 and the manner in which a service request is processed is explained below.

B. Telephone terminal

Telephone terminal 110 can be a conventional telephone set, comprising a transmitter and receiver, invoking communications using DTMF signals, or any other instrument or machine capable of functioning in a similar manner. The telephone terminal 110 can also be more sophisticated devices, such as a key telephone system and a private branch exchange.

C. LEC switch

Local exchange carrier (LEC) switch 115 is a switch that tandems telephone terminal 110 to an interexchange carrier (IXC). An IXC is more commonly known as a long distance carrier, such as for example MCI Telecommunications Corp.

Telephone terminal 110 is located in a local access and transport area (LATA), which is provided local telephone services by a LEC. The LEC uses one or more LEC switches 115 to route phone calls locally, i.e., within the LATA. However, for long distance services the LEC routes the call to a special LEC switch 115 for long distance routing. In this case, LEC switch 115 is known as a central office (CO) switch.

D. Switch

Switch 120 is an IXC switch. Switch 120 tandems (or switches) calls from LEC switch 115 to another IXC switch called a bridging switch 130. Switch 120 can be, for example, a Digital Multiplexing Switch 250 (DMS-250 switch) available from Nortel (Northern Telecom) Corporation.

E. Bridging switch

Bridging switch 130, which is another IXC switch, provides a connection between the switch 120 and the voice or audio platform 150. Bridging switches are employed for interfacing to any voice or audio platform. They allow service requests (including collect calls), requiring processing by the transaction processing units located on these platforms, to be performed in an efficient manner. For the example of a collect call, this efficiency results from the ability of bridging switch 130 to release channels to the voice or audio platform 150 after the collect call is established. This will be explained further below.

In addition, bridging switch 130 can perform other important functions, such as providing billing services. Billing services are employed to determine how much to bill for a telephone call. A 1-800 call, for example, requires special billing services, which are handled by IXCs in unique ways. Like switch 120, bridging switch 130 can be a DMS-250 available from Nortel Corporation.

F. Voice or audio platform

Voice or audio platform 150 comprises call processors 160, 170, 180. The call processors have transaction processing units 161–164, as well as transaction processing units that are shown but not labeled. In a dedicated channel connection, the number of trunks coming into and going out of each transaction processing unit are fixed in number. For example, each transaction processing unit can receive 48 channels over two T1 trunks, with 24 inbound channels coming into each transaction processing unit 161–164 and 24 outbound channels going out over each transaction processing unit 161–164. The inbound channels are used for receiving calls coming into each transaction processing unit. The outbound channels are used to make calls going out from each transaction processing unit.

1. Call processors

Call processors 160, 170 and 180 represent the systems that set up the connection in the switching system in a well known way. For example, as recognized by those of ordinary skill, call processor 160 performs call set up for the calls arriving at the transaction processing units 161–164.

2. Transaction processing units

Each of the transaction processing units 161–164 is a system capable of processing one or more types of service requests. Collect calls are one example of a type of service request. Other examples include, but are not limited to, credit card calls, operator assistance calls and telephone charge card calls. More than one transaction processing unit may be capable of processing the same type of service requests. These transaction processing units of similar function may be located at different call processors.

An application may be associated with each of the types of service requests. The application is implemented as a combination of hardware, software, firmware, or the like. The application, when executed, performs tasks required of the transaction processing unit. Such tasks include playing scripted messages for callers and receiving data from callers. The scripted messages are transmitted over the T1 trunks to the callers. The data received from callers includes messages spoken by a caller and DTMF signals input by a caller from the telephone keypad. The applications can use the recorded data to make decisions regarding the call and to route the call, for example to a called party.

Transaction processing units can include voice or audio response units. As recognized by those of ordinary skill, a voice or audio response unit provides synthesized voice responses to DTMF signal inputs, processing calls based on information derived from computer-based look-up tables, information received from callers, and information carried with the incoming call.

An example of a transaction processing unit, akin to transaction processing units 161–164, is what is known as a master control frame in the telecommunications industry. An example master control frame is available from Intervoice Company, 17811 Waterview Parkway, Dallas, Tex. 75252.

G. High bandwidth pipe

A high bandwidth pipe is a trunk group comprising a number of individual trunks. Each trunk is a communication line between two network elements. In FIG. 1, high bandwidth pipe 140 is shown to connect bridging switch 130 to voice or audio platform 150. The high bandwidth pipe is distributed into a series of T1 trunks, with a pair of T1 trunks connecting to each transaction processing unit 161–164.

As shown, each pair of T1s (connecting to a transaction processing unit) can carry enough frequency bandwidth for 48 channels, with each channel carrying data corresponding to a single voice channel. In the example embodiment, there is one T1 dedicated for incoming calls to a transaction processing unit (i.e., 24 channels), and one T1 dedicated for outgoing calls from a transaction processing unit (i.e., another 24 channels). As recognized by those of ordinary skill, however, this breakdown is arbitrary and is not significant for the invention.

H. Signaling network

A signaling network, such as the CCS network, can be used to provide call set-up and call servicing. These functions include monitoring the status of the signaling links in use, indicating the arrival of an incoming call, transmitting routing and destination signals, and other such important functions. Call set-up is performed before the actual call data is transmitted from the telecommunications network 100 on the voice channels across the high bandwidth pipe 140 to the voice or audio platform 150.

Signaling networks are well known in the field of telecommunications, even with respect to voice or audio platforms. For a detailed understanding of an exemplary CCS network, specifically a signaling system 7 (SS7) signaling network, the reader is referred to "Signaling System #7" (Travis Russell, ISBN 0-07-054991-5, McGraw-Hill, New York, N.Y. 10020), which is incorporated herein in its entirety by reference.

Though the CCS network is not shown in FIG. 1, it is described with respect to the present invention below. However, it is important to note that the CCS network described below is used in a way that is unique to the present invention.

III. The present invention

A. Disadvantages of the dedicated channel connection

There are a number of disadvantages with the dedicated channel connection. Because the T1s are dedicated to the transaction processing units 161–164, the transaction processing units 161–164 cannot share bandwidth. This is extremely wasteful of circuit resources. Most service requests to the voice or audio platform 150 do no require outbound T1s. Yet, the telecom service provider may have no other option than to dedicate an equal number of inbound and outbound T1s to each transaction processing unit 161–164. This is done to ensure that if an inbound call to the voice or audio platform 150 requires an outgoing leg, then it will be available.

The dedicated channel connection also wastes resources of the voice or audio platform 150. If the voice or audio platform 150 resources have the processing power, but not the required bandwidth, to process a call, then transaction processing units 161–164 are not optimally utilized.

Another problem relates to the provision of signaling. Unfortunately, such intelligent devices as voice or audio platform 150 do not conventionally separate signaling and voice circuits where there are dedicated connections between the voice circuits and the transaction processing units 161–164.

B. An introduction

Figure 2:
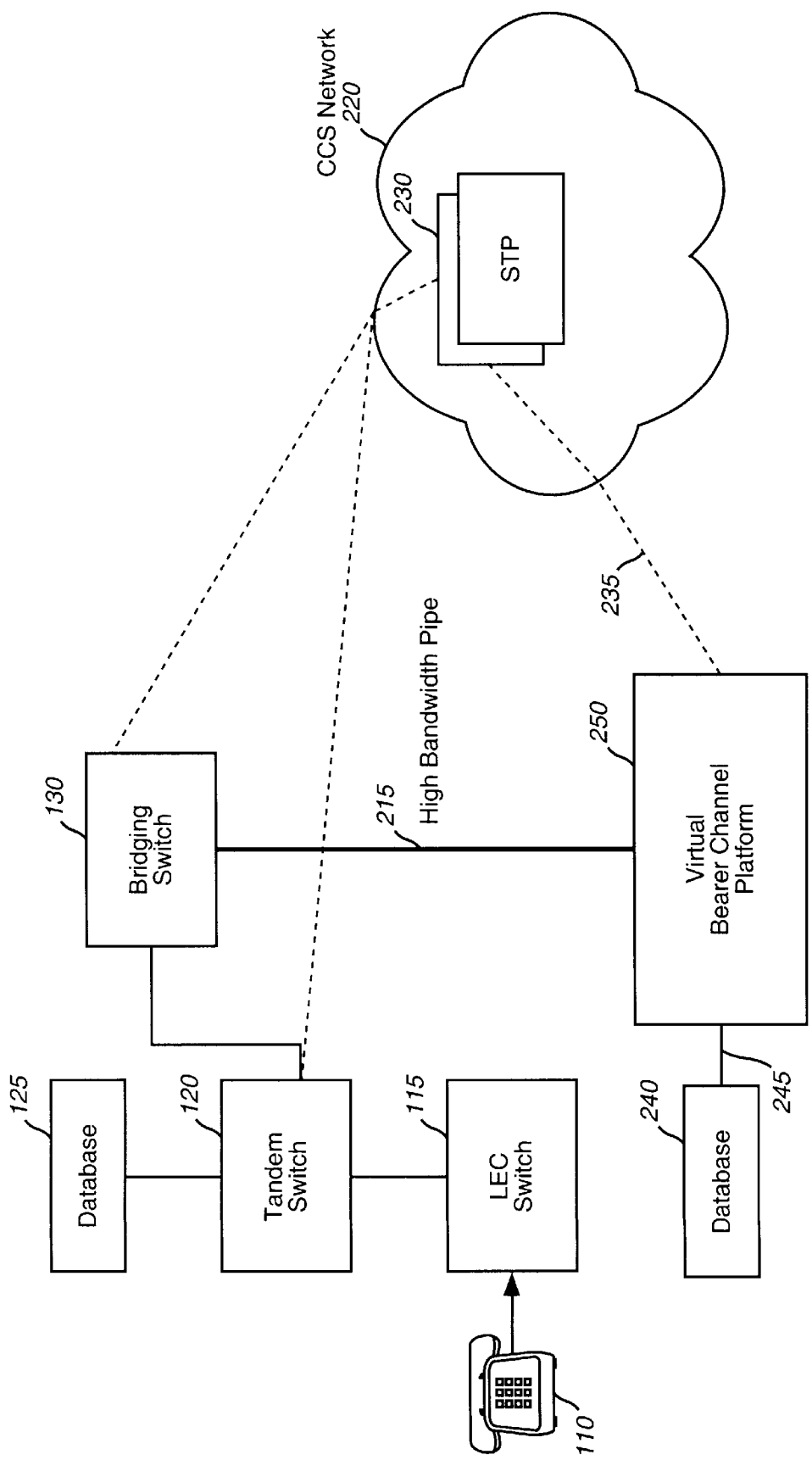
FIG. 2 is a block diagram illustrating the telecommunications network used to employ the present invention.

FIG. 2 is a block diagram illustrating the telecommunications network used to employ the present invention. The telecommunications network comprises telephone terminal 110, LEC switch 115, switch 120, database 125, bridging switch 130, and a signaling transfer point (STP) pair 230.

In one embodiment, database 125 can be MCI's data access point (DAP), although database 125 can be any database recognized by those skilled in the art. Database 125 can be located external to switch 120 (i.e., an external database) or instead can be located within switch 120 (i.e., an internal database).

STP pair 230 is part of a CCS network 220 (i.e., in an embodiment where CCS network 220 is an SS7 signaling network) used to set up a call before call data is transmitted. Examples of CCS signaling on CCS network 220 include (1) any ANSI (American National Standards Institute) ISUP signaling message; (2) any ITU (International Telecommunications Union) ISUP signaling message; and (3) any ISUP signaling message that is country specific (i.e., any variations of ISUP that vary from country to country). STP pair 230 is a pair of redundant packet switches that receive packetized signaling information over the CCS network 220.

FIG. 2 also includes a virtual bearer channel platform 250 and an associated database 240. Database 240 can be located external to the virtual bearer channel platform 250 (i.e., an external database) or instead can be located within the virtual bearer channel platform 250 (i.e., an internal database).

C. Transmission of the call to the bridging switch

Figure 3:
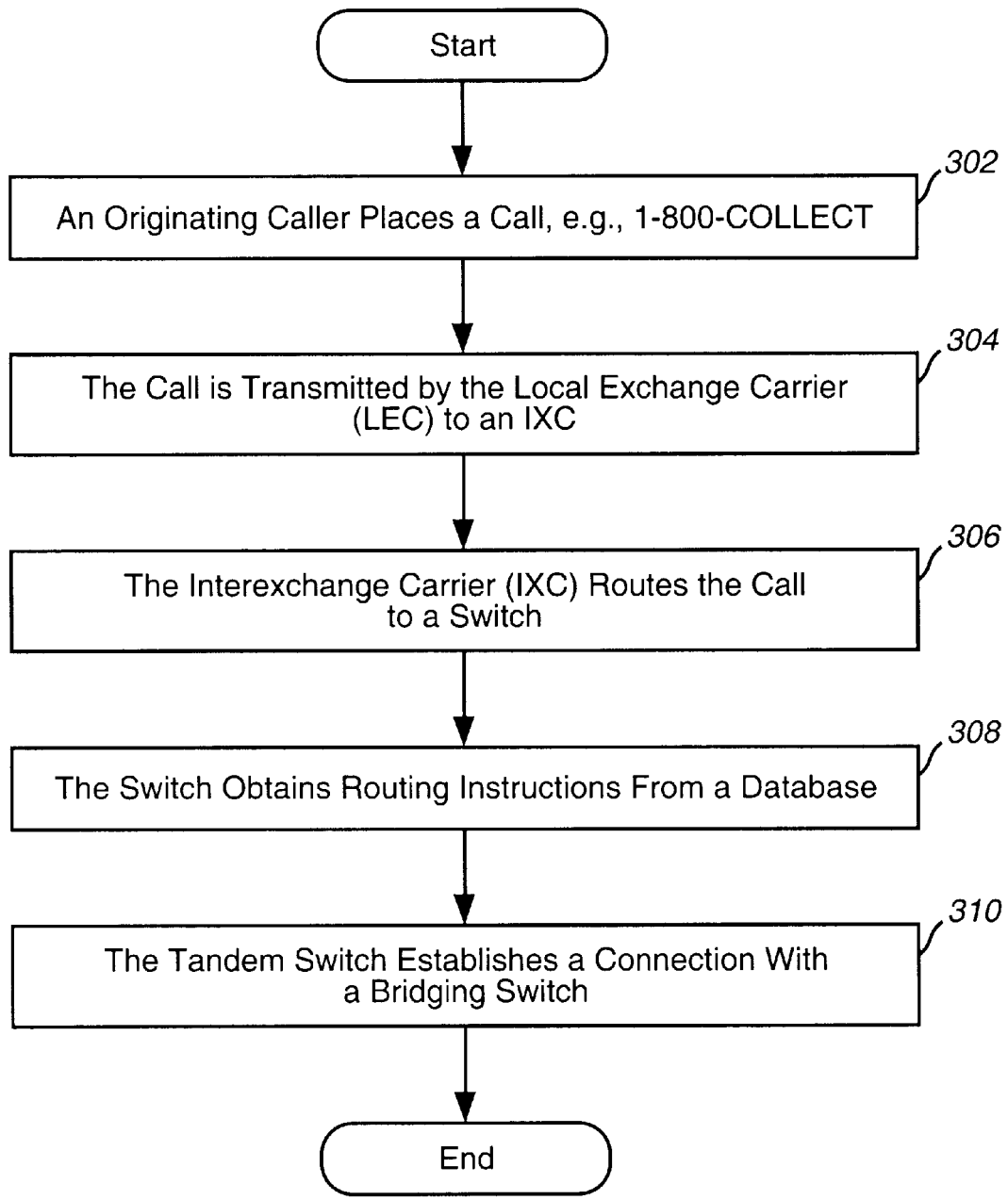
FIG. 3 is a flow chart illustrating how the call is transmitted from a caller to a bridging switch 130.

FIG. 3 is a flow chart illustrating how the call is transmitted to the bridging switch 130. In step 302, an originating caller using telephone terminal 110 desires to place a collect call, in particular a collect call that will be handled by the virtual bearer channel platform 250. For example, the originating caller dials on the key pad of the telephone terminal 110 the number 1-800-COLLECT. A call then originates from telephone terminal 110.

In step 304, the call is transmitted by the LEC to the LEC switch 115. In the present embodiment, LEC switch 115 is a CO and the call is transmitted therefrom to an IXC (not shown) in a well known manner.

In step 306, the receiving IXC routes the call to an IXC switch. Specifically, the IXC routes the call to switch 120 in a well known manner.

In step 308, switch 120 accesses the database 125. Database 125 translates the number 1-800-COLLECT to a telephone number associated with the virtual bearer channel platform 250 (the destination number of the virtual bearer channel platform 250). The database 125 also returns important routing information for the call.

The inventive signaling network includes all types of CCS networks recognized by those skilled in the art. In one embodiment, the inventive CCS network is an SS7 signaling network. A brief description of an SS7 signaling network, specifically as it is utilized in the present invention, will facilitate a better understanding of the invention. For this discussion, the SS7 signaling messages are described as having four layers, although layer 4 (user layer) can be divided into two layers. The first layer Message Transfer Part—layer 1 (MTP-L1) defines the physical, electrical, and functional characteristics of the signaling data link and the means to access it. The second layer (MTP-L2) defines the functions and procedures for, and related to, the transfer of signaling messages over signaling data links. The MTP-L2 functions include delimitation of signaling messages, error detection and correction, and signaling link failure detection.

The third layer (MTP-L3) provides the signaling network functions, for transferring messages between the signaling points, which are nodes of the signaling network and identified by a unique point code. The signaling message handling function will insure that the signaling messages originated by a particular user part at a signaling point (originating point) are delivered to the same user part at the destination point indicated by the sending user part.

The fourth layer for this area of concern is the Integrated Services Digital Network (ISDN) User Part (ISUP). The ISUP defines the protocol that supports the signaling functions required to provide voice and non-voice services. The ISUP is used to transport such information as the calling party number, and trunk management information.

The first two fields of the ISUP are the circuit identification code (CIC), followed by the Message Type (MT). The CIC identifies the circuit (bearer channel) selected by the call processing at the originating switch. The MT defines a message from a set of messages used to support the setup, takedown, and management of bearer channels.

There is a variety of ISUP messages. The most common ISUP messages are the initial address message (IAM), address complete message (ACM), answer message (ANM), release message (REL), and release complete (RLC). There are other messages not listed here. (ANSI T1-111/1995 and T1-113/1995.)

In one embodiment, in addition to the destination telephone number of the virtual bearer channel platform 250, the switch 120 also uses the database 125 to retrieve a circuit identification code (CIC). This CIC identifies an available bearer channel between the switch 120 and the bridging switch 130. In another embodiment, the switch 120 determines the available bearer channel without using the database 125.

In step 310, switch 120 establishes a connection to bridging switch 130. First, switch 120 generates an IAM and transmits it to bridging switch 130 over the signaling network 220, via STP pair 230. The IAM includes the CIC, i.e., identifying a bearer channel that is available between the switches. The IAM also includes the destination number of the virtual bearer channel platform 250, and all required routing information. Specifically, the IAM has a CIC set to the trunk identifier (i.e., identifying the bearer channel), an originating point code (OPC) set to the point code of the originating switch (i.e., switch 120) and a destination point code (DPC) set to the point code of the destination switch (i.e., bridging switch 130).

After call set up by the CCS network 220 is completed, the call is routed to the bridging switch 130 over the available bearer channel.

D. SONET Bus

The present invention uses two different SONET (synchronous optical network) protocol formats in a distribution network (SONET bus) on virtual bearer channel platform 250. The distribution network connects the transaction processing units on virtual bearer channel platform 250.

In a first embodiment, a standard SONET protocol is used. Standard SONET is a protocol for high speed signals transmitted using circuit-switched synchronous multiplexing. Physical interfaces for SONET include synchronous transport signal (STS) frames and optical carrier (OC) frames. For a detailed understanding of the standard SONET format, the reader is referred to several publicly available sources, including "SONET and T1 Architecture for Digital Transport Networks," Uylesses Black and Sharlene Waters, ISBN# 0-13-447590-9.

A standard SONET frame includes a transport overhead field, comprising a section overhead field and a line overhead field, a path overhead field, stuffing bytes, and main portion for transmitting data (in the form of virtual tributaries or VTs). In a telecommunications network, paths are comprised of one or more lines, which in turn are comprised of one or more sections. A path is a logical end-to-end link between users. A line is a segment between two nodes, used for multiplexing, synchronizing, switching, and cross-connecting the SONET signal. A section is a segment typically between regenerators and nodes, used for framing and locating faults in the communication. Therefore, the path overhead field, the line overhead field, and the section overhead field are used to effect communications between their corresponding communications segments, i.e., paths, lines, and sections.

In this embodiment, a SONET cross-connecting controller assigns each bearer channel data of the high bandwidth pipe 215 to specific byte positions in the SONET bus. The SONET bus uses a VT1.5 cell format, operating at an OC-3 rate. For OC-3 rate operation, 28 VT1.5 cells are interleaved into a single STS-1 frame, and 3 STS-1 frames are interleaved into a single STS-3 frame. An STS-3 frame has 84 cells for carrying channel data, and 162 additional bytes used for overhead and stuffing. A single VT1.5 cell is the equivalent of 27 bytes of data.

The 162 bytes (the equivalent of 6 cells) are used as follows: 81 bytes for a transport overhead field (section overhead and line overhead fields); 27 bytes for a path overhead field; and 54 bytes for additional stuff bytes. A single STS-1 has a transport overhead field, comprising a section overhead field and a line overhead field, having 27 bytes (i.e., equivalent to a single cell). However, since three STS-1 frames are interleaved to form a single STS-3 frame, the resulting STS-3 frame transport overhead field comprises 81 bytes.

The section and line overhead fields of the inventive STS-1 frame (i.e., interleaved into an STS-3 frame) can be better understood with reference to Tables 1 and 2 and FIGS. 4A and 4B. FIG. 4A illustrates the bytes of a section overhead field 420, arranged as rows of 3 bytes. These bytes are explained in Table 1. Similarly, FIG. 4B illustrates the bytes of a line overhead field 440, arranged as rows of 3 bytes. These bytes are explained in Table 2. In FIG. 4A, the first two bytes of the section overhead 420 are the A1, A2 bytes, used for synchronization. Referring to FIG. 4B, the first cell position (i.e., the position of the first cell carrying channel data) can be determined from the line overhead pointer bytes H1, H2. The remaining cell positions are determined from the well known interleaving technique.

TABLE 1

Section Overhead

| Field | Description |
|---|---|
| A1, A2 | flags used for synchronization by receiving machines |
| C1 | used for STS-1 identification |
| B1 | bit interleaved parity (BIP-8) byte for the previous STS-1 |
| E1 | over wire byte for the 64 kbits/s voice path |
| P1 | set aside for the network provider |
| D1, D2, D3 | used for signaling control and administrative alarms |

TABLE 2

Line Overhead

| Field | Description |
|---|---|
| H1, H2 | offset in bytes to the first byte of the SPE |
| H3 | used to frequency justify (negative value only) |
| B2 | bit interleaved parity (BIP-8) parity code calculated for all bits in the line overhead |
| K1, K2 | identify automatic protection switches (APS) |
| D4–D12 | used for line communications and are part of a 576 kbits/s message used for maintenance control, monitoring and alarms |
| Z1 | reserved |
| Z2 | block error protection on broadband ISDN UNI |
| E2 | order wire byte |

In the STS-3 frame of the present embodiment, the remaining 84 cells are used for carrying data. Each cell has 27 bytes, 24 bytes for carrying channel data and 3 bytes acting as Virtual Tributary (VT) overhead bytes. Each data byte contains a single bearer channel, so that a single cell carries 24 bearer channels (i.e., corresponding to one T1).

Communications over the SONET bus is effected by successive frames. Each successive frame has the same sequence of cells. A single cell is designated for any communication over a given bearer channel. Hence, a transaction processing unit on virtual bearer channel platform 250 can find the correct bearer channel from the SONET bus by finding the appropriate cell. In other words, each transaction processing unit will transmit and receive data on one or more assigned cells, corresponding to bearer channels.

In this embodiment, the transport overhead and packing overhead bytes are used for operations, administration and maintenance (OAM). Hence, this embodiment includes 84 cells used to carry bearer channels, 54 fixed stuffing bytes used as space fillers for the interleaving operation, and 81 bytes (for transport overhead) plus 27 bytes (for path overhead) used for OAM. Therefore, the bandwidth used is 155.52 MHZ (8000 frames/second×((84 cells/frame×27 bytes/cell)+81 bytes+27 bytes+54 bytes)×8 bits/byte), amounting to an OC-3 rate. The data is transmitted on the SONET bus at OC-3 speed, being interpreted as a standard VT1.5 format.

A second embodiment of the present invention uses a modified SONET format. In the modified SONET format, it is recognized that because the SONET signal is transmitted in the closed loop of the inventive SONET bus (distribution network 540), the overhead and stuffing bytes are not required. Therefore, in each frame the 162 additional bytes that are normally used for the overhead and stuffing bytes are used as cells (i.e., 6 cells) that carry channel data. By such a modification, this embodiment enables the usage of 90 cells at OC-3 speed (155.52 MHZ), versus 84 cells. By using 90 cells, the embodiment can support 90×24 bearer channels, or 90 T1s. In addition, not having to deal with the overhead fields makes this embodiment less processor intensive. As with the previous embodiment, the frames (i.e., 90 cells) are repeated 8000 times/second to support voice applications.

Figure 4C:
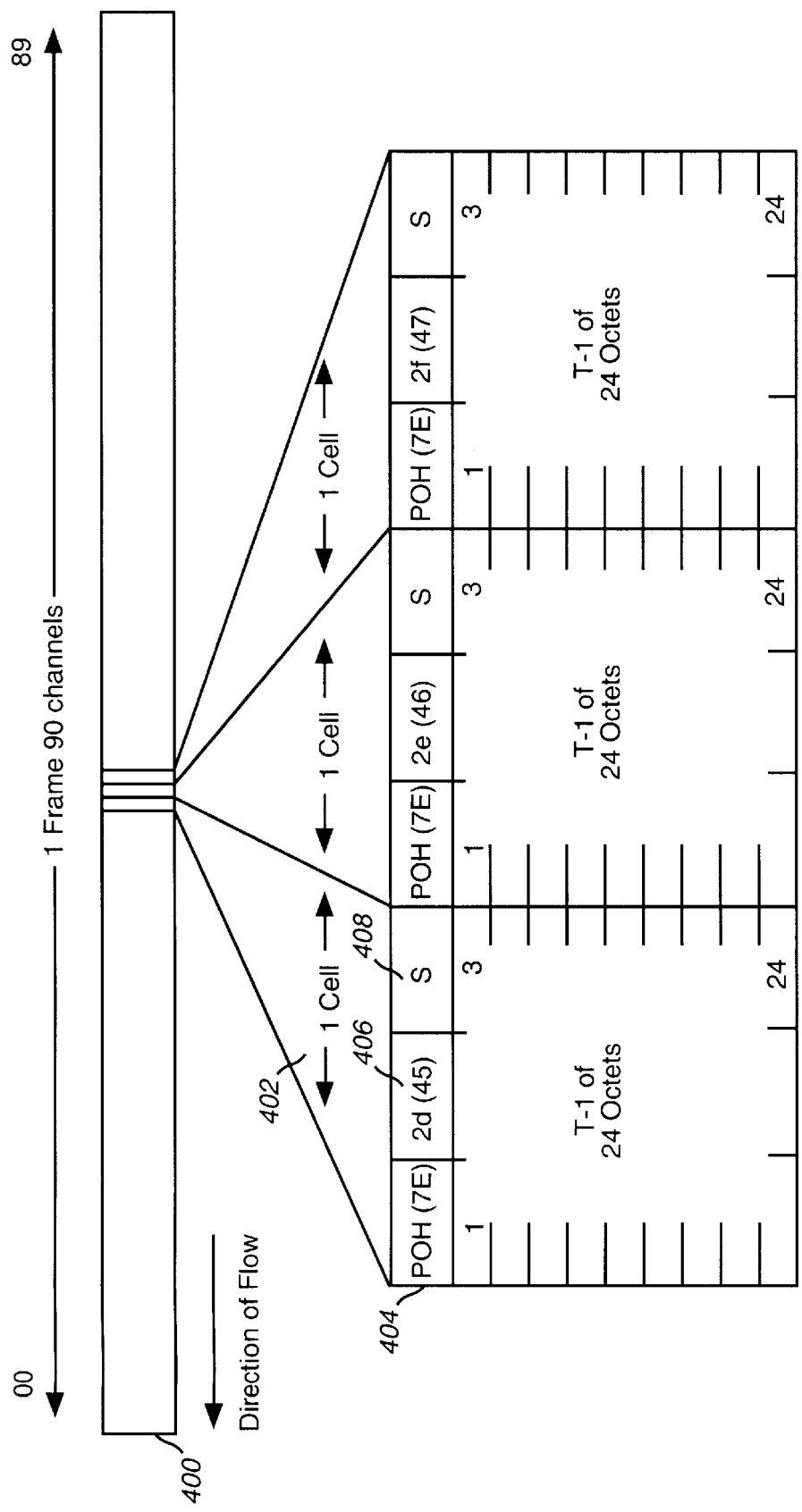

FIG. 4C illustrates a modified VT1.5 SONET format for this embodiment. The modified SONET format is the same for an individual cell as the standard format, but differs in that 6 more cells are used in the frame. The SONET frame 400 is repeated 8000 times per second. A cell 402 has 27 bytes ("octets"). Of these, 24 bytes 408 correspond to the 24 bearer channels of a T1 pipe. Thus, each cell 402 has 24 bytes for carrying data, with each of these bytes carrying a bearer channel. The remaining three bytes in each cell 402 are VT overhead bytes. As shown, of the remaining three bytes in cell 402, one byte 404 is used for synchronization (always has the value 7E), the second byte 406 is used as a cell identifier (has values in the range of 0–89), and the third byte is unused.

Since ninety cells together form frame 400, the total bandwidth used is 155.52 MHZ (8000 frames/second×90 cells/frame×27 bytes/cell×8 bits/byte), i.e., OC-3 rate. Therefore, the data is transmitted on the SONET bus at OC-3 speed, but the content is interpreted according to the modifications described herein.

Even though the virtual bearer channel platform of the present invention is described with reference to standard and modified SONET formats, it will be apparent from the description provided herein that alternative embodiments can be implemented using other SONET compatible formats (e.g., OC-1, OC-12, OC-48, etc.) with other transmission standards and speeds, depending upon suitable applications. The manner in which the virtual bearer channel platform of the present invention uses the standard and modified VT1.5 standard will be clearer from the discussion below.

E. The virtual bearer channel platform

Figure 5:
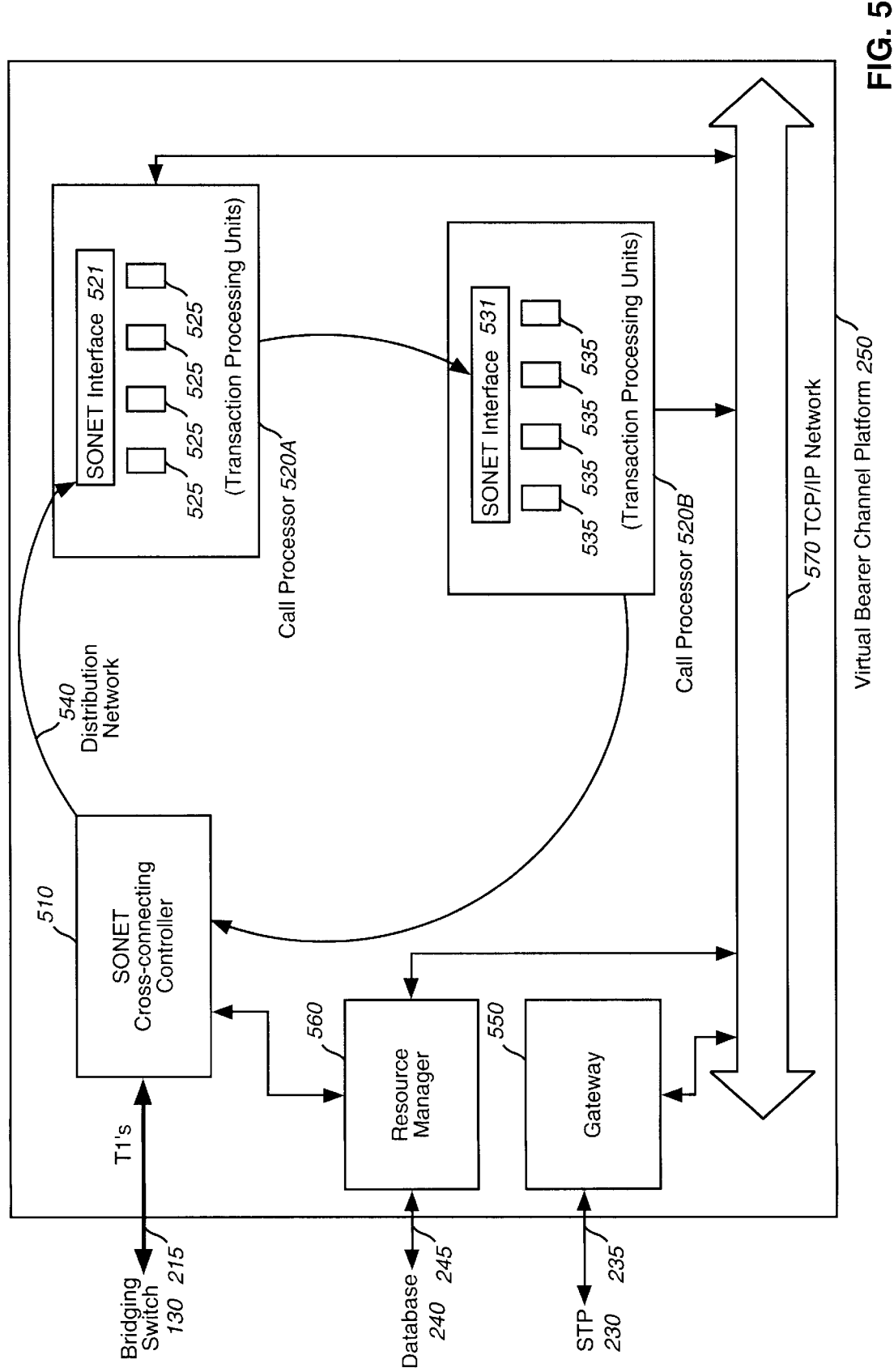
FIG. 5 is a block diagram illustrating the virtual bearer channel platform of the invention.

FIG. 5 is a block diagram illustrating the virtual bearer channel platform 250 in detail. Virtual bearer channel platform 250 includes a SONET cross-connecting controller 510, call processors 520A and 520B having SONET interfaces 521, 531, transaction processing units 525, 535, a distribution network 540, a gateway 550, a resource manager 560 and a transmission control protocol/internet protocol (TCP/IP) network 570.

For the present invention, transaction processing units 525, 535 are not limited to such processors as voice response units. For example, in one embodiment, the transaction processing units are individual modems or banks of modems. These modems can function as access switches, providing access to one or more additional networks. For example, banks of modems 525, 535 can provide access to an asynchronous transfer mode (ATM) network or a frame relay network, which in turn provide internet access via an internet service provider (ISP).

Virtual bearer channel platform 250 will be described as operating with communication network 100 of FIG. 2. However, it should be understood that virtual bearer channel platform 250 can be adapted to operate with other types of external networks without departing from the scope and spirit of the present invention.

It is also important to note that the inventive virtual bearer channel platform 250 does not necessarily correspond to what is recognized in the art as a virtual bearer channel platform, and is provided herein only to provide ease of understanding. For example, the platform resources (e.g., transaction processing units 525, 534, gateway 550, resource manager 560 and SONET cross-connecting controller 510) may be located at great geographical distances from one another, such that the resource would not be considered part of what is currently understood to be a "platform." Accordingly, virtual bearer channel platform is to be defined by the functional relationships between the resources as provided herein, and not any current notions of a virtual bearer channel platform.

1. Distribution network and SONET interfaces

In a preferred embodiment, distribution network 540 is a SONET Bus. The SONET bus transports bearer channels between the bridging switch 130 and the transaction processing units 525, 535. In other words, the SONET bus can be thought of conceptually as a frame structure for bearer channel signals coming into the virtual bearer channel platform 250 from the high bandwidth pipe 215and for bearer channel signals going out over the high bandwidth pipe 215 from the virtual bearer channel platform 250.

Within the virtual bearer channel platform 250, the transaction processing units 525, 535 can add data to or remove data from the SONET bus, using the SONET interfaces 521, 531, respectively. Therefore, the SONET bus is effectively a SONET loop that traverses all the transaction processing units 525, 535 of the virtual bearer channel platform 250. The signal of the bearer channels coming in over the high bandwidth pipe 215 is time division multiplexed to form the SONET bus. As noted, a standard SONET format signal or a modified SONET format signal can be used.

2. SONET cross-connecting controller

SONET cross-connecting controller 510 is coupled to the T1s of the high bandwidth pipe 215 on one side (outside the virtual bearer channel platform 250) and to distribution network 540 on the other side (inside the virtual bearer channel platform 250). SONET cross-connecting controller 510 is a multiplexer and demultiplexer. For example, SONET cross-connecting controller 510 can be an add-drop multiplexer (ADM).

SONET cross-connecting controller 510 time division multiplexes the data coming in from the high bandwidth pipe 215. It also time division demultiplexes the data going back out over the high bandwidth pipe 215. It provides an interface between the two sides (i.e., high bandwidth pipe 215 and distribution network 540) to transfer the bearer channel data from one side to the other while conforming to the interface standards on the respective sides.

3. Gateway

Gateway 550 is a programmable protocol converter that handles all signaling functions for the virtual bearer channel platform 250. Gateway 550 can, for example, be a combination of hardware and software implemented on a computer system implementing an operating system (e.g., the Unix Operating System). Although the gateway 550 is described in this section, its functions are more fully described below in the discussion of FIGS. 6–8.

Gateway 550 receives CCS messages coming in over the CCS line 235.It converts a received CCS message into the TCP/IP protocol and generates a corresponding TCP/IP message. It then transmits the generated TCP/IP message over the TCP/IP network 570 to the resource manager 560. In the preferred embodiment, the TCP/IP network 570 is a type of ethernet network. In one embodiment, the generated TCP/IP message uses the proprietary MCI Switch Protocol (MSP). However, as recognized by those of ordinary skill, any type of similar protocol can be used as well. For example, any byte-oriented protocol or any protocol defined by using abstract syntax notation 1 (ASN.1) can be used. Examples of protocols include, but are not limited to, Enterprise Computer Telephony Forum (ECTF) S.200, X.25, SNA, ITU Q931.

Gateway 550 also receives TCP/IP messages transmitted from the resource manager 560 over the TCP/IP network 570. As illustrated in the discussion below, in response the gateway 550 can then generate and transmit a corresponding CCS message over the CCS line 235.

Gateway 550 performs all timing functions required by the CCS protocol and the TCP/IP protocol. It also handles all CCS flow control, overload processing, and management activities required by both the CCS network and the resource manager 560.

Those of ordinary skill will note that the gateway 550 can perform a similar function for protocols other than any specific CCS protocol and the TCP/IP protocol. The reason is that a primary importance of the gateway 550 is to act as a conduit between the resource manager 560 and the CCS network 220.

4. Resource Manager

Resource manager 560 is a key component of the present invention. In a preferred embodiment, it comprises a combination of hardware and software implemented on a computer system using the Unix Operating System. Although the resource manager 560 is described in this section, its functions are more fully described below in the discussion of FIGS. 6–8.

a. Maintaining resource status

A key function of the resource manager 560 is the maintenance of status information about the elements of the virtual bearer channel platform 250. This information is readily stored in and retrieved from an internal or external database 240. For example, such an accessible database is MCI's data access point (DAP), although database 240 can be any database recognized by those skilled in the art.

The resource manager 560 maintains the status of each bearer channel coming into the virtual bearer channel platform 250 over high bandwidth pipe 215. It also maintains the status of each bearer channel going out from the virtual bearer channel platform 250 over the high bandwidth pipe 215. The resource manager 560 determines the incoming bearer channel status by determining which bearer channels coming into the SONET cross-connecting controller 510 (from the high bandwidth pipe 215) are available and which of these bearer channels are in use. Similarly, the resource manager 560 determines the outgoing bearer channel status by determining which bearer channels coming out of the SONET cross-connecting controller 510 are available and which of these bearer channels are in use.

The resource manager 560 maintains the present status and the potential status of each transaction processing unit 525, 535. For example, the resource manager 560 has knowledge of which transaction processing units are busy, and which are available. It can also have knowledge of how long a given transaction processing unit 525, 535 has been in use.

In addition, the resource manager maintains knowledge of which transaction processing units 525, 535 can process a call coming into the virtual bearer channel platform 250. For example, the resource manager 560 determines which transaction processing units 525, 535 can process a 1-800-COLLECT call. This includes knowledge of whether a given call requires special processing. For example, if the destination number is an 800 number, the number can be translated to different numbers depending on the time of day, etc. As with other data, the resource manager 560 obtains this information by accessing an internal or external database, such as the database 240. Other special processing requirements include connecting to an operator as specified by the database or providing additional voice prompts before turning the control over to the transaction processing unit 525, 535.

b. Incoming Calls

When a service request comes into the platform over the CCS line 235, gateway 550 informs the resource manager 560 of the service request by sending it a message. The resource manager 560 determines from this message on which bearer channel data is coming. It then assigns the data to an available transaction processing unit 525, 535 capable of processing the call.

In determining to which transaction processing unit 525, 535 to direct an incoming call, the resource manager 560 performs load balancing (also called load sharing). For example, based on a predetermined or real time calculation, the resource manager 560 can distribute the incoming call to the transaction processing units 525, 535 such that the transaction processing units 525, 535 have equivalent processor usage, i.e., for processing efficiency.

In a preferred embodiment, the resource manager performs load balancing by keeping track of the 'present load' on each transaction processing unit 525, 535. The present load may be measured as a function of a number of variables. One variable is the fraction of the available processing power used in a pre-determined amount of time in the recent past. The fraction of processing power used can be ascertained, for example, by using utilities provided by the operating system supporting the individual transaction processing units 525, 535. Another variable is the number of service requests allocated to the transaction processing unit 525, 535. A third variable is the nature of the service requests allocated to the transaction processing units 525, 535.

c. Outgoing calls

In some cases, the transaction processing units 525, 535 will need to make an outgoing call from the virtual bearer channel platform 250. For the example of a 1-800-COLLECT call, the transaction processing unit 525 receiving the call will first record information from the caller, e.g., the caller's name and the called party telephone number. Next, the transaction processing unit 525 will need to call the called party in order to verify acceptance of the call and complete the connection between the caller and the called party.

This leg of the call (to the called party) is a call directed out of the virtual bearer channel platform 250. When the transaction processing unit 525 desires to make an outbound call, it informs the resource manager 560. The resource manager 560, in turn, selects an available bearer channel for the outgoing leg over the high bandwidth pipe 215. It sends this information to gateway 550, which uses the CCS network 220 to connect to the called party. The outgoing leg of the call is then transmitted over the available bearer channel selected by the resource manager 560.

d. Unavailability or failure of resources

The resource manager 560 also handles unavailability or failure of resources. If no transaction processing units 525, 535 are available to process the incoming call, the resource manager 560 can queue the call so it can be processed by the next available transaction processing unit. The resource manager 560 can also park the call at an alternative transaction processing unit, which plays pre-recorded messages indicating a delay to the caller. If the call is parked, it is also placed in a queue until the next appropriate transaction processing unit becomes available.

If it is determined that the platform cannot support the call, the resource manager 560 can send a release message (e.g., REL) to the bridging switch 130, requiring the bridging switch 130 to release the call. The bridging switch 130 will send back a message acknowledging the release.

The platform is made self-healing by making use of the knowledge about failed transaction processing units. In response to such knowledge, the resource manager 560 will update its database.

If a transaction processing unit becomes inactive during processing of a call, it will notify the resource manager 560. In turn, the resource manager 560 will reassign the call to a different transaction processing unit on virtual bearer channel platform 250.

If any of the CICs coming in (or going out) over the high bandwidth pipe 215 are lost, the resource manager 560 will update its status accordingly. For example, the resource manager 560 will update its database to indicate the condition. The functions of the resource manager are more fully described below.

F. Establishing an incoming bearer channel with a transaction processing unit

Figure 6:
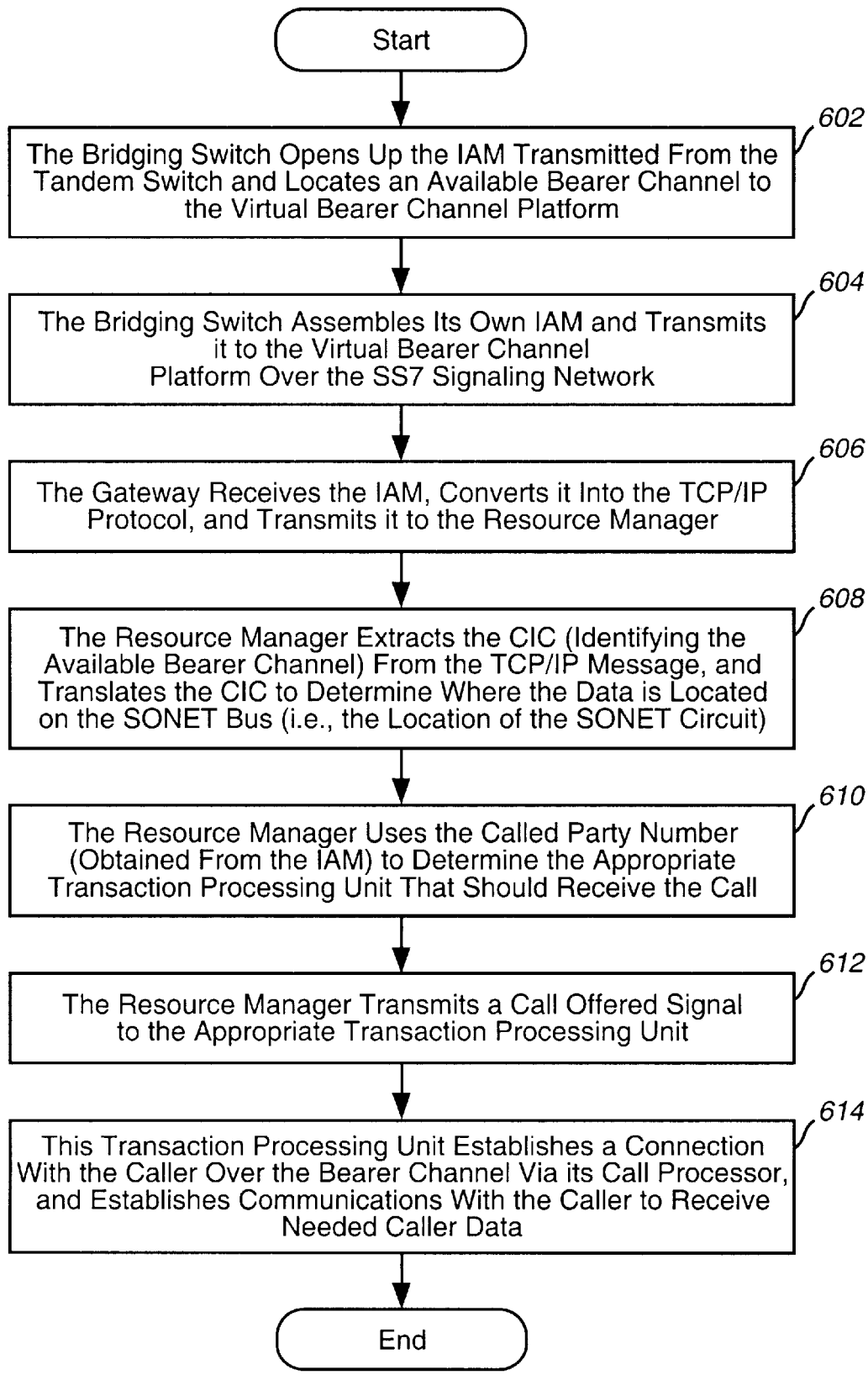
FIG. 6 is a flow chart illustrating how the call is connected from a bridging switch to a transaction processing unit on the virtual bearer channel platform.

FIG. 6 is a flow chart illustrating how the call is connected from the bridging switch 130 to a transaction processing unit 525 on the virtual bearer channel platform 250.

In step 602, bridging switch 130 examines the IAM transmitted from the switch 120 and determines that the connection must be made to the virtual bearer channel platform 250. The bridging switch 130 locates an available bearer channel going to the virtual bearer channel platform 250. This is an available bearer channel along the high bandwidth pipe 215.

Concurrently or thereafter in step 604, bridging switch 130 also assembles its own IAM for transmission to the virtual bearer channel platform 250. This IAM includes the designation of the selected bearer channel (i.e., the CIC), the destination point code of the virtual bearer channel platform 250, and other important routing information. The IAM is transmitted over the signaling network 220 along with the other signaling information. For example, the IAM (more correctly the CCS message containing the ISUP IAM) will include the selected bearer channel (i.e., the CIC), an OPC field set to the point code of the bridging switch 130, and a DPC field set to the point code of the virtual bearer channel platform 250. The CCS signaling message is transmitted to STP pair 230 over signaling trunks 235. From the STP pair 230, the CCS message is transmitted to the virtual bearer channel platform 250.

In step 606, gateway 550 receives the CCS message (the IAM) from STP pair 230. Gateway 550 is a protocol converter. It converts the CCS message from the particular CCS protocol to, for example, a TCP/IP protocol. The TCP/IP message is transmitted over TCP/IP network 570, which can be an ethernet network, to resource manager 560.

In step 608, the resource manager 560 extracts the CIC from the TCP/IP message. The resource manager 560 then translates the CIC, using an internal or external database 240, to determine where the data is located on the SONET bus. Specifically, the resource manager 560 determines the cell identifier 406 (the second byte) and the position of the bearer channel within the cell, which is one of the 24 channels of that cell.

In step 610, the resource manager 560 uses the called party number extracted from the IAM to determine which transaction processing unit 525 (or 535) is to receive the call. This called party number is the number returned by database 125, which represents a translated version of the number 1-800-COLLECT. Again, the resource manager can perform a look-up in database 240 to determine the correct transaction processing unit 525.

In allocating this received service request to an appropriate transaction processing unit 525, 535, the resource manager 560 maintains an active list of which transaction processing units 525, 535 have the capability to process which types of calls. This active list can be maintained in an internal or external table, (e.g., database 240) which the resource manager 560 can readily access. For example, for 1-800-COLLECT calls, the resource manager 560 must have knowledge of which transaction processing units 525, 535 can process collect type calls.

The resource manager 560 can also perform load balancing in determining which transaction processing unit 525, 535 is to process a call. This is done so that the transaction processing units 525, 535 are not unduly loaded, for more efficient utilization of these resources.

In accomplishing load balancing, resource manager 560 keeps track of the 'present load' on each transaction processing unit. The present load can be measured as a function of several variables. One variable is the fraction of the processing power that is available. Another variable is the number of service requests allocated to the transaction processing unit 525, 535. A third variable is the nature of the service requests allocated to the transaction processing unit.

In step 612, the resource manager 560 then transmits a call offered signal to the appropriate transaction processing unit 525. As noted, each bearer channel coming into the virtual bearer channel platform 250 at SONET cross-connecting controller 510 comes in over a bearer channel. The resource manager 560 has knowledge of the availability of all of the bearer channels coming into and going out of the virtual bearer channel platform 250 by accessing an external or internal database 240. Each bearer channel is assigned to a specific bit position within the frame of the SONET bus, which can be referred to as a SONET circuit or a distribution network circuit.

Therefore, based on the bearer channel of the received call, the resource manager 560 designates in the call offered signal which bit positions (or SONET circuit) the transaction processing unit 525 will use to access incoming data. Here, the transaction processing unit 525 is one that is available and is capable of processing a 1-800-COLLECT call.

In step 614, the transaction processing unit 525 establishes a connection with the designated SONET circuit via the call processor 520A. Determining the call to be a 1-800-COLLECT call, the transaction processing unit 525 then plays one or more scripted messages (or prompts) asking for information from the caller.

The scripted message is followed by actuation of the transaction processing unit 525 and the call processor 520A to receive information from the caller that is either spoken or keyed into the telephone terminal 110, followed by recording of the information by the transaction processing unit 525. For example, the caller can be asked for the caller's name, which is recorded by the transaction processing unit 525 when spoken by the caller. After this, the caller is asked to key in the number being called, which is recorded by the transaction processing unit 525 as a series of dual tone multi-frequency (DTMF) signals. The communication established between the caller at telephone terminal 110 and the transaction processing unit 525 is over a bidirectional line.

G. Establishing an outgoing bearer channel with the called party

Figure 7A:
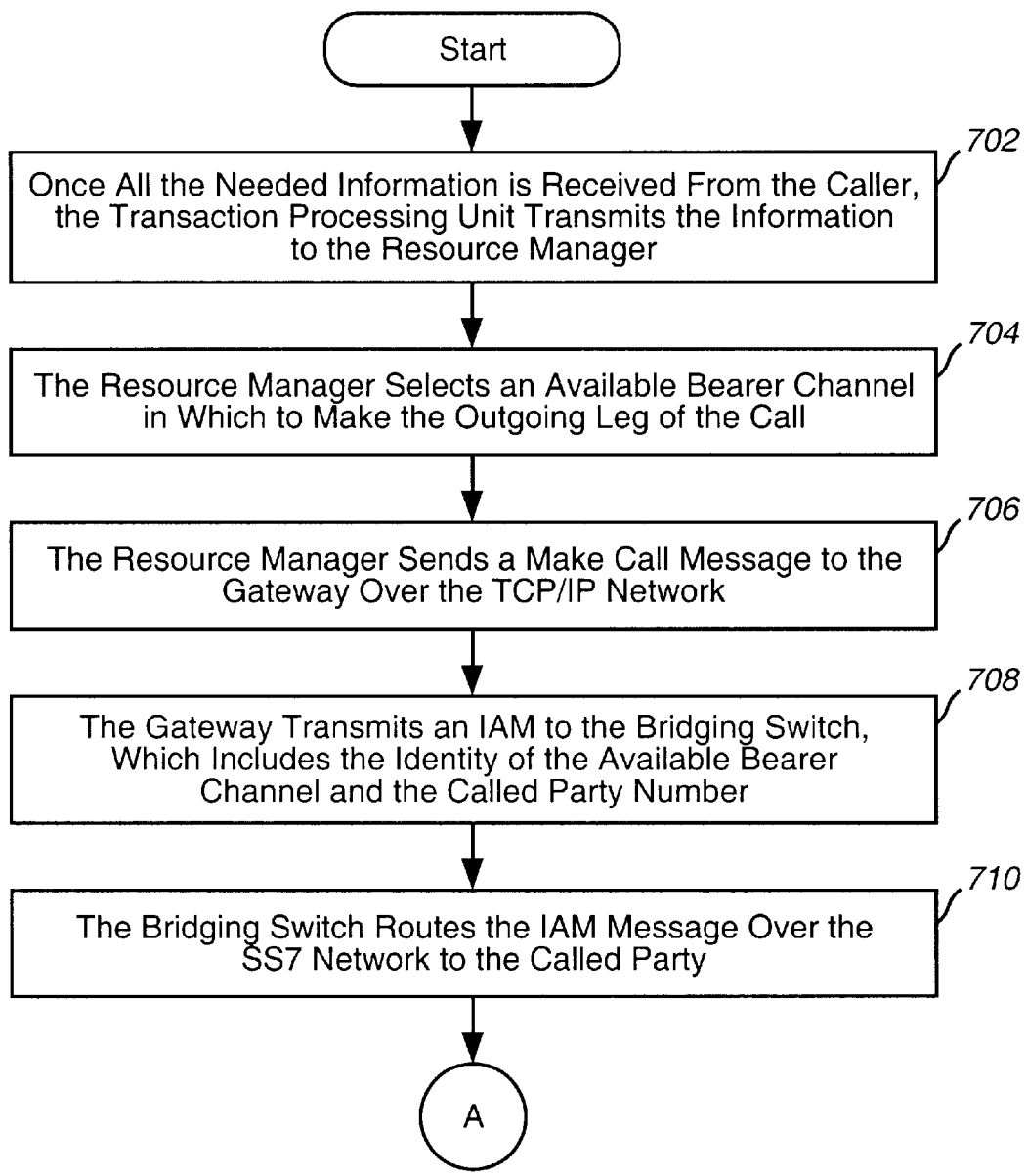
FIGS. 7A and 7B are flow charts illustrating how the call is connected from a transaction processing unit to a called party.
Figure 7B:
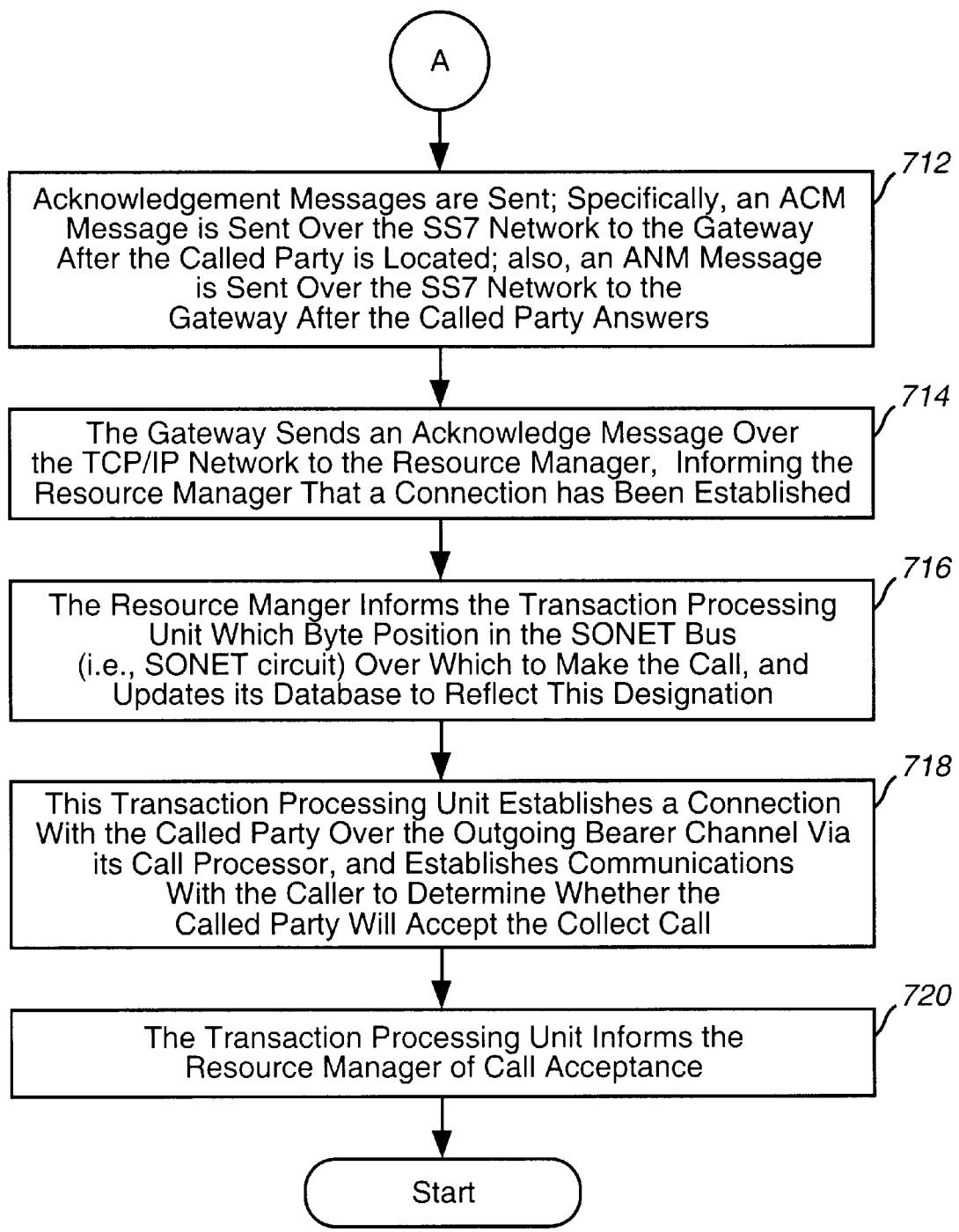

FIGS. 7A and 7B are flow charts illustrating how the call is connected from a transaction processing unit 525 to the called party.

In step 702, once all the information is collected from the caller, then the transaction processing unit 525 transmits the information to the resource manager 560. The resource manager 560 has knowledge of the availability of all of the bearer channels coming into and going out of the virtual bearer channel platform 250 by accessing database 240.

In step 704, the resource manager 560 then selects an available SONET circuit, i.e., an empty cell in the SONET bus, in which to make the outgoing leg of the call. This is the leg of the call that goes out from the virtual bearer channel platform 250. Accordingly, in step 706 resource manager 560 sends a make call message to the gateway 550. This message is transmitted over TCP/IP network 570.

In step 708, the gateway uses the information transmitted from the make call message to generate a corresponding CCS message. Specifically, the gateway 550 generates an IAM, including the called party number (the number being called by the caller) and the available bearer channel. An IAM message is transmitted to the bridging switch 130, including the available bearer channel (i.e., CIC), an OPC set to the point code of the virtual bearer channel platform 250, and a DPC set to the point code of the bridging switch 130.

In step 710, the bridging switch 130 transmits the message to the called party. As recognized by those of ordinary skill, the called party can be located in a number of ways. The bridging switch 130, in combination with the CCS network, must transmit the call to an appropriate LEC switch (specifically a CO switch) that will locate the called party. For example, the call is transmitted to one or more switches, one of which may have a connection to the LEC switch of the called party. The LEC switch, operating within the called party's LATA, transmits the call to the called party.

In step 712, address complete (ACM) and answer (ANM) messages are sent back to the gateway 550 from the network. For instance, after the IAM is received at the LEC switch, an ACM is transmitted back to the gateway 550 over the CCS network 220. Subsequently, when the called party answers the telephone (goes off-hook), an ANM message (an ISUP message) is transmitted back to the gateway 550 over the CCS network 220.

In step 714, after the gateway 550 receives the ANM message, it sends a connected message over the TCP/IP network 570 to the resource manager 560. (This informs the resource manager 560 that a connection has been established over an outgoing bearer channel to the called party.)

In step 716, the resource manager 560 translates the bearer channel, using the database 240, to determine where outgoing messages should be placed on the SONET bus. Specifically, the resource manager 560 determines the cell identifier 406 and the position of the bearer channel within the cell. In addition, the resource manager 560 informs the transaction processing unit 525 the position on the SONET bus to which the outgoing leg of the call corresponds. The resource manager updates the status.

In step 718, the transaction processing unit establishes a connection to the called party using the SONET circuit (the designated channel in the SONET bus) by means of the call processor 520A. The transaction processing unit 525 then plays one or more scripted messages (or prompts) that informs the called party of the collect call and provides the called party the opportunity to accept or decline the call. The scripted message is followed by actuation of the transaction processing unit 525 and the call processor 520A to receive information from the caller that is either spoken or keyed into the telephone terminal 110, followed by recording of the information by the transaction processing unit 525.

For example, the transaction processing unit 525 plays a prerecorded message informing the caller "You have a collect call from", followed by the recorded voice of the caller speaking his own voice, such as "Timothy." The caller is then given the opportunity to accept or decline the call by keying in a digit indicating "Yes" or "No." The transaction processing unit 525 will accept the called party's response to determine whether or not to provide a connection between the callers. The communication established between the transaction processing unit 525 and the called party is over a bidirectional line.

If the call is not accepted, the transaction processing unit 525 can also inform the caller of the called party's refusal to accept the call. In this scenario, the call is released. The transaction processing unit 525 will notify the resource manager 560 of the need to release the call. It will also transmit a message to the gateway 550 that release is required. Gateway 550 will send the bridging switch 130 REL (release) messages over the CCS network 220. The bridging switch will send back an RLC (release complete) message to verify the release of the call. The gateway 550 then notifies the resource manager 560 of the release, after which the resource manager 560 will update database 240 and store the status of the bearer channels.

In step 720, when the called party accepts the call, then the transaction processing unit 525 transmits a message indicating this condition to the resource manager 560.

H. Releasing the virtual bearer channel platform

Figure 8:
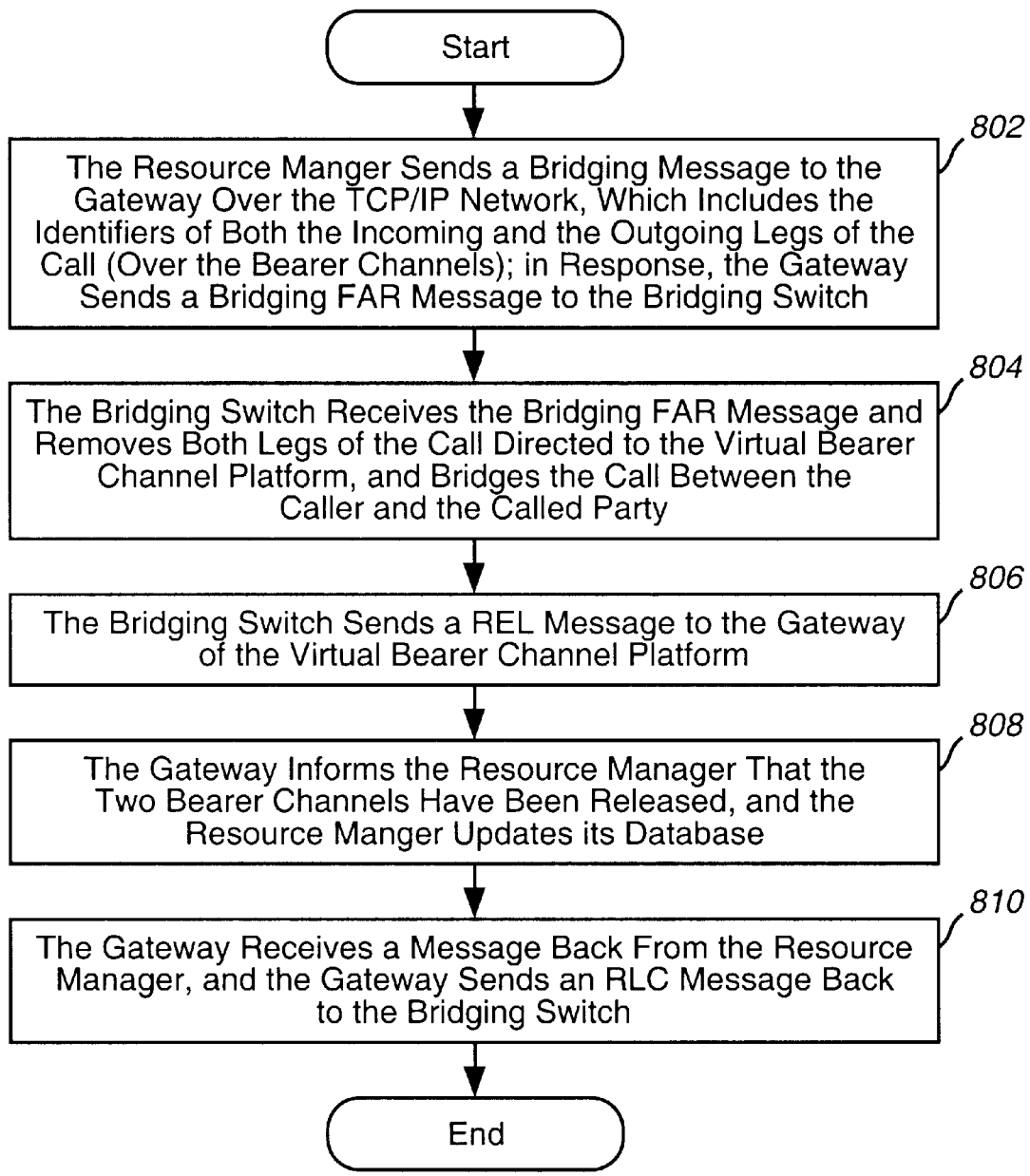
FIG. 8 is a flow chart illustrating how the caller is connected to the called party, and the virtual bearer channel platform is released from the connection.

FIG. 8 is a flow chart illustrating how the caller is connected to the called party, and the virtual bearer channel platform 250 is released from the connection. This occurs if the called party accepts the call.

In step 802, the resource manager 560 sends a bridging message over the TCP/IP network 570 to the gateway 550. The bridging message includes the CICs of both the incoming connection (i.e., via bearer channel) to the transaction processing unit 525 from the caller and the outgoing connection (i.e., via bearer channel) from the transaction processing unit 525 to the called party. The bridging message informs the gateway 550 to transmit a bridging FAR message, which identifies the two bearer channels. In response, the gateway 550 sends out the bridging FAR message to the bridging switch 130.

In step 804, the bridging switch 130 receives the bridging FAR message, identifying the incoming and the outgoing legs of the call. In response, the bridging switch 130 bridges the two legs of the call, i.e., between the caller and the bridging switch 130, and between the bridging switch 130 and the called party.

The bridging switch releases the bearer channels going to the transaction processing unit 525 from the bridging switch 130 and the bearer channel coming out of the transaction processing unit 525 going to the bridging switch 130.

In step 806, a release (REL) message is transmitted over the CCS network 220. Specifically, the bridging switch 130 transmits a REL message to the gateway 550 of the virtual bearer channel platform 250.

In step 808, gateway 550 informs resource manager 560 (over the TCP/IP network 570) that the two bearer channels have been released. In response, resource manager 560 updates database 240 to indicate that the two bearer channels are once again available for other communication.

In step 810, resource manager 560 informs gateway 550 of the release (i.e., the receipt of a message indicating the release). In response, gateway 550 transmits a release complete (RLC) message back to the bridging switch 550, indicating that the release has been completed.

I. Unavailability or failure of resources

1. Transaction processing units unavailable

It is possible that when a service request (i.e., the IAM) is received at the virtual bearer channel platform 250, no required transaction processing unit 525, 535 is available. As one example, the resource manager 560 determines that none of the transaction processing units 525, 535 are available. As another example, the resource manager 560 determines that no transaction processing unit 525, 535 capable of handling this particular incoming call is available.

As one option, the resource manager 560 can queue the incoming call and wait for an available transaction processing unit. As another option, the resource manager 560 can park the incoming call at another transaction processing unit. This alternative transaction processing unit will provide bit positions on the SONET bus to play a recorded message for the caller. For example, the alternative transaction processing unit can play the message "We're sorry, but all circuits are busy. Please hold." or instead a musical greeting. The resource manager 560 will put the service request on a queue. In predesignated units of time, the resource manager 560 will check the status of the required transaction processing unit 525, i.e., the transaction processing unit that can process the call. When the required transaction processing unit 560 becomes available, the resource manager 560 will transfer the call to it for processing by sending it a call offered message, as with any other call.

2. Transaction processing unit failure

It is possible that the transaction processing unit 525, 535 will fail. In this case, the resource manager 560 will move the call to another transaction processing unit on the same virtual bearer channel platform 250.

J. A supplemental embodiment

Figure 9:
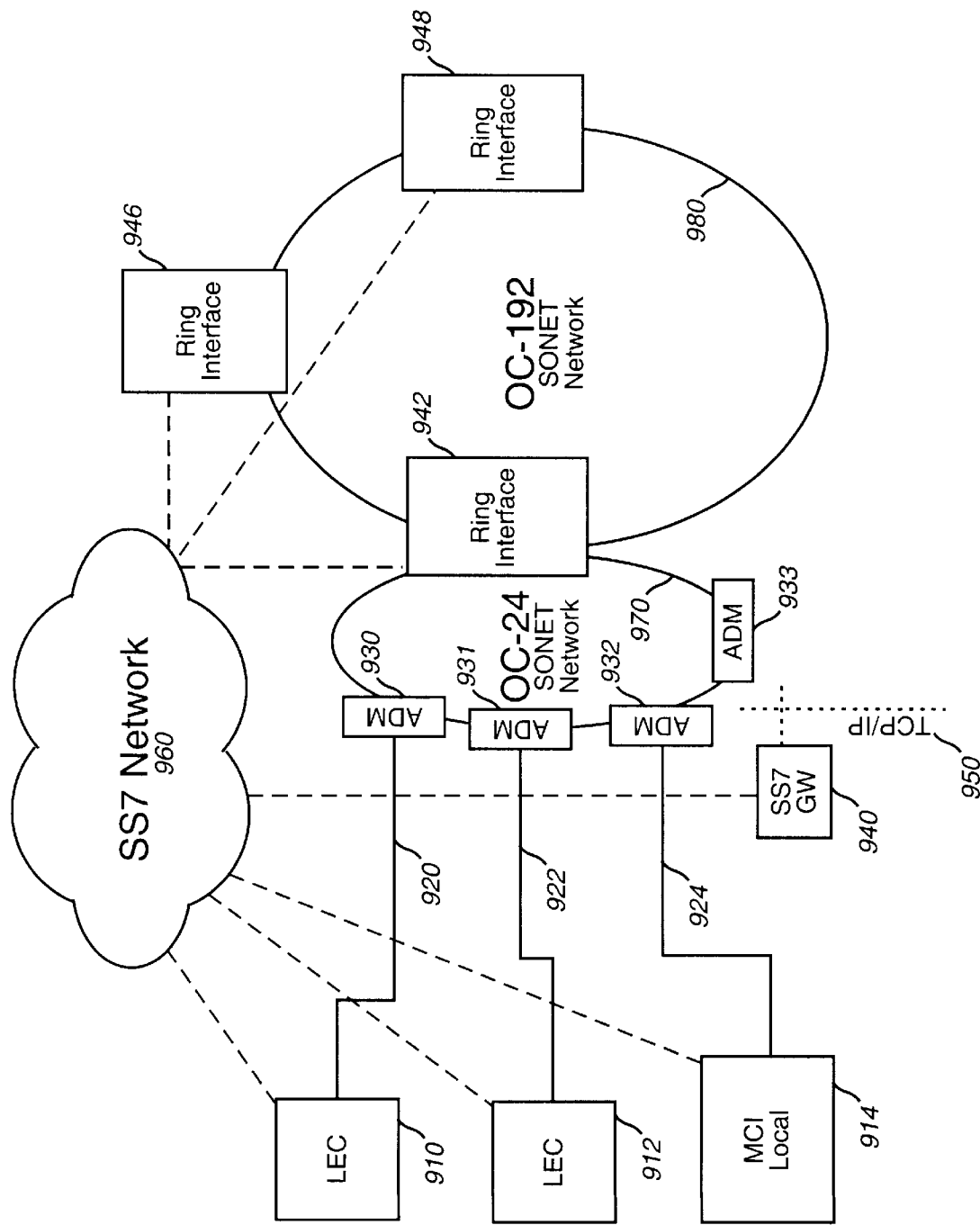
FIG. 9 is a block diagram illustrating an embodiment with more than one SONET cross-connecting controllers and two or more distribution networks joined together in the form of rings.

FIG. 9 is a block diagram illustrating a supplemental embodiment. This embodiment illustrates (1) how a virtual bearer channel platform can have more than one SONET cross-connecting controllers, and (2) how two or more distribution networks can be joined together in the form of rings.

LEC 910, LEC 912 and MCI local network 914 provide communications to OC-24 SONET network 970 (i.e., a distribution network) by bearer channels on high bandwidth pipes 920, 922 and 924, respectively. These bearer channels are respectively multiplexed onto ADMs 930, 931 and 932. Accordingly, ADMs 930,931 and 932 serve as SONET cross-connecting controllers, providing access to SONET network 970.

An SS7 gateway 940 is illustrated, providing the protocol conversion function for signaling messages directed between SS7 network 960 and a platform TCP/IP network 950. One or more resource managers (not shown) can manage the resources of a virtual bearer channel platform defined by SS7 gateway 940, ADMs 930–933, TCP/IP network 950 and SONET network 970.

Although an SS7 network 960 and corresponding SS7-using network elements 940, 942, 946 and 948 are illustrated, any CCS network and corresponding elements can be used as recognized by those skilled in the art. Similarly, although SONET networks 970, 980 are illustrated, any distribution network can be used, as recognized by those skilled in the art.

Ring interface 942 connects the OC-24 SONET network 970 to the much higher rate OC-192 SONET network (i.e., another distribution network). Ring interface 942, itself, comprises a time division multiplexer (TDM) and corresponding a processor, as well as a SONET interfaces (not shown). Ring interface 942 accepts bytes of data coming into it on an inbound path (i.e., from SONET network 970) and transmits these bytes in an outbound path (i.e., onto SONET network 980). For the inbound path, a processor will place bytes of data from a SONET interface (interfacing with the SONET network 970) onto a TDM bus. For the outbound path, a processor will place the same bytes of data from the TDM bus onto a SONET interface interfacing with SONET network 980. Ring interface 942 performs signaling functions similar to the inventive gateway (as described above) in determining the locations of the bytes of data on the SONET networks 970, 980, and is therefore connected with SS7 network 960.

Ring interfaces 946 and 948 can perform a similar function as ring interface 942, providing access to additional distribution networks. In addition, each of ring interfaces 942–948 can provide access to more than one other distribution networks by performing the same path-in, path-out function on multiple distribution networks, with accompanying signaling messages. In this latter case, ring interfaces 942–948 are more appropriately called "hub interfaces."

IV. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A virtual bearer channel platform for processing a service request received on a communications network, said virtual bearer channel platform comprising:
   a plurality of transaction processing units;
   a distribution network coupled to said plurality of transaction processing units; and
   a cross-connecting controller coupled to said distribution network and said communications network, said cross-connecting controller receiving data corresponding to said service request from said communications network and providing the received data on said distribution network to one of said plurality of transaction processing units,
   wherein bandwidth on said distribution network is shared by said plurality of transaction processing units.

2. The virtual bearer channel platform of claim 1, wherein said distribution network comprises one of:
   a standard SONET distribution network; and
   a modified SONET distribution network.

3. The virtual bearer channel platform of claim 1, further comprising a resource manager for allocating the received service request to one of said plurality of transaction processing units.

4. The virtual bearer channel platform of claim 3, further comprising a gateway for interfacing with said communications network to provide a connection between a bearer channel on which said service request is received and said one of said plurality of transaction processing units to which said service request is allocated.

5. The virtual bearer channel platform of claim 4, wherein said communications network comprises a common channel signaling (CCS) network.

6. The virtual bearer channel platform of claim 4, wherein said communications network includes a plurality of bearer channels including said bearer channel on which said service request is received,
   wherein said cross-connecting controller forwards data received on said bearer channel on which said service request is received to said one transaction processing unit.

7. The virtual bearer channel platform of claim 6, wherein said distribution network is implemented using a modified SONET-type protocol,
   wherein said modified SONET-type protocol is defined by a plurality of frames, with each of said frames comprising a plurality of bytes,
   wherein data corresponding to each of said bearer channels is dedicated to be transferred on predetermined bytes within each of said frames, and
   wherein said cross-connecting controller provides data corresponding to said service request on the bytes dedicated to said bearer channel on which said service request is received.

8. A method of processing a service request received by a virtual bearer channel platform on a communications network, said virtual bearer channel platform including a plurality of transaction processing units, said method comprising the steps of:
   receiving data corresponding to said service request;
   forwarding the data to one of said plurality of transaction processing units using a distribution network, wherein said distribution network is shared by said plurality of transaction processing units; and
   processing said service request in said one of said plurality of transaction processing units.

9. The method of claim 8, further comprising the step of:

allocating said service request to said one of said plurality of transaction processing units using a resource manager.

10. The method of claim 9, wherein said distribution network is implemented using one of:

a standard SONET distribution network; and a modified SONET distribution network.

11. The method of claim 10, further comprising the step of:

receiving an indication of arrival of said service request and an identifier of a bearer channel from a gateway, and sending said identifier from said gateway to said resource manager.

12. The method of claim 11, further comprising the step of:

receiving by said resource manager said identifier of a bearer channel and translates the identifier to determine a location of data on the distribution network.

13. A virtual bearer channel platform connected to a communications network with one or more bearer channels, said virtual bearer channel platform comprising:

a plurality of transaction processing units for processing or transmitting a service request;

a distribution network providing communications with said plurality of transaction processing units within said virtual bearer channel platform; and a cross-connecting controller for routing service requests received on the one or more bearer channels in the communications network to the plurality of transaction processing units over the distribution network.

14. The virtual bearer channel platform according to claim 13, wherein said service request is an inbound service request received by the virtual bearer channel platform from the communications network.

15. The virtual bearer channel platform according to claim 13, wherein said service request is an outbound service request sent by the virtual bearer channel platform to the communications network.

16. The virtual bearer channel platform according to claim 13, further comprising:

a resource manager for controlling access of said plurality of transaction processing units to said distribution network and for maintaining a status of said bearer channels and said distribution network.

* * * * *